June 11, 1946. H. F. KILBRIDE 2,401,874
GRINDING MACHINE
Filed April 18, 1944
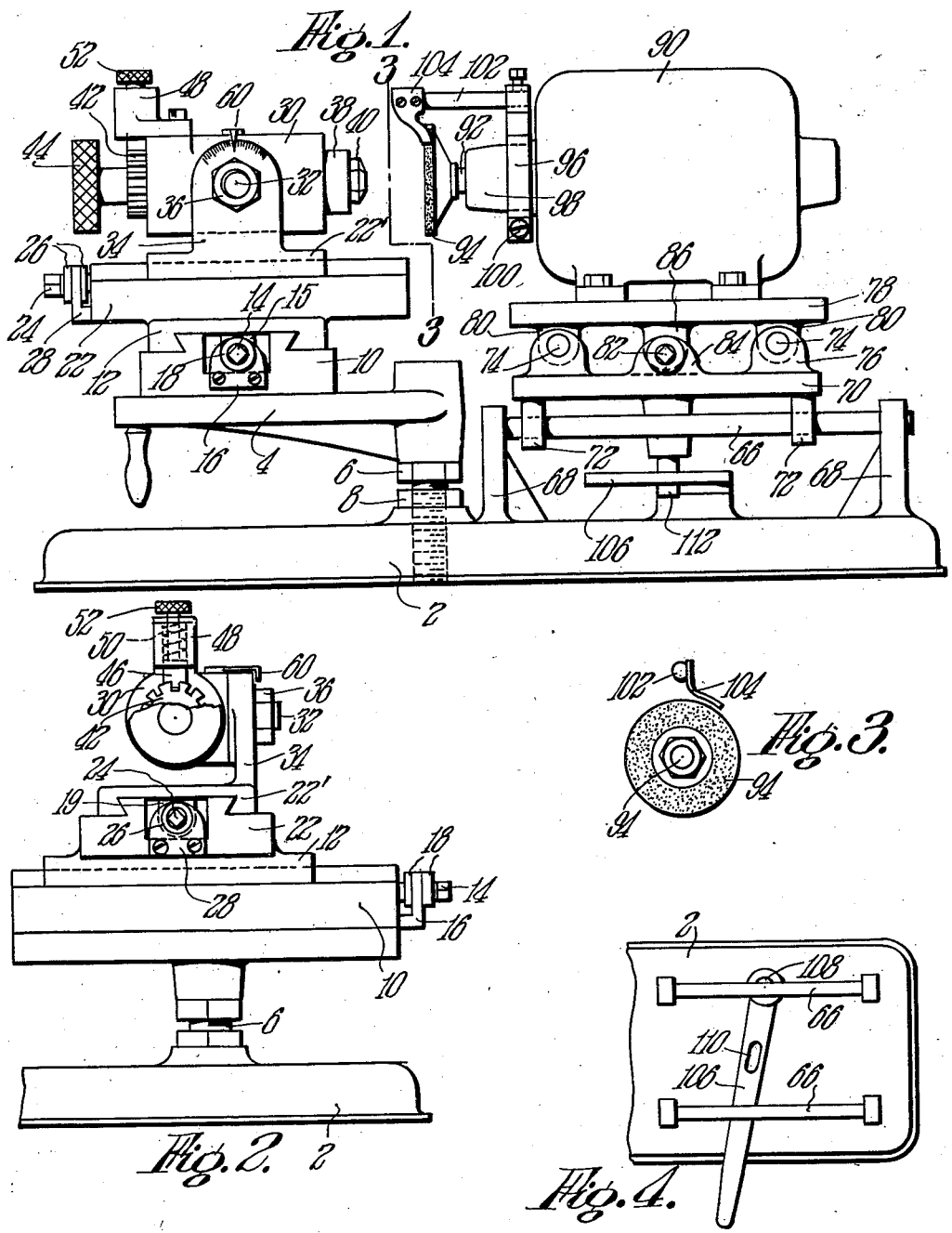
INVENTOR.
Herbert F. Kilbride.
BY Walter C. Ross
Attorney Patented June 11, 1946

2,401,874

UNITED STATES PATENT OFFICE 2,401,874

GRINDING MACHINE

Herbert F. Kilbride, Longmeadow, Mass.

Application April 18, 1944, Serial No. 531,551

1 Claim. (Cl. 51—34)

This invention relates to grinding machines and is directed more particularly to machines for grinding tools such as cutters, reamers and the like.

The principal objects of the invention are directed to machines for grinding the cutting edges of tools of various kinds such as cutters, reamers and the like, and is characterized by means for oscillating a tool holder and means for adjusting the relative position of the tool holder, oscillating means and grinding means.

Various novel features and advantages of the invention will be hereinafter more fully referred to in connection with the accompanying description of the invention in the form at present preferred with reference to the drawing, wherein:

Fig. 1 is a side elevational view of a grinding machine embodying the novel features of the invention;

Fig. 2 is a partial end elevational view of the machine shown in Fig. 1;

Fig. 3 is a sectional elevational view on the line 3—3 of Fig. 1; and

Fig. 4 is a partial plan view of the base of the machine shown in Figs. 1 and 2.

Referring now to the drawing more in detail, the invention will be fully described.

A base is represented by 2 for supporting the mechanism.

A table 4 is arranged on a stud 6 for oscillatory movements, said stud being in screw threaded engagement with the base 2 to facilitate the table being moved up and down relative to the base. A lock nut 8 on the threaded part of stud 6 provides a means for locking the stud in place.

A guide 10 is fixed to the table 4 and a transverse slide 12 is slidable back and forth thereon. An operating screw 14 is rotatable in a plate 16 secured to guide 10 with collars 18 fixed thereto at opposite sides of the plate 16. The member 14 is provided with screw threads operably engaging a lug 15 on slide 12 so that as the member 14 is rotated in one direction or the other the slide 12 may be moved back and forth.

The slide 12 carries a guide 22 and a longitudinal slide 22' is slidable back and forth thereon. A screw member 24 similar to that already described is provided with collars 26, is rotatable in a plate 28 of the guide 22 and in threaded engagement with a lug 19 on the slide 22'.

Thus the slide 12 is adjustable transversely and the slide 22' is adjustable towards and away from the axis of oscillation of the table 4 or longitudinally.

A head 30 has a trunnion 32 mounted for rotation in a part 34 of slide 22'. A locking member in the form of a nut 36 is in threaded engagement with the trunnion 32 for locking the head 30 in adjusted angular positions.

A spindle 38 is rotatable in the head 30 for carrying the tool to be ground and may carry a hollow split collet 40 of well known form for receiving and gripping a tool.

A notched wheel 42 on the spindle 38 has a manually engageable member 44 for rotating the spindle. A dog 46 slidable in a bracket 38 fixed to the head 30 is urged downwardly by a spring 50 and is movable upwardly by a manually engageable member 52.

The spindle may be rotated to various adjusted positions by retracting the dog and thereby indexed as may be desired for positioning the tool relative to the grinding wheel. Also the spindle may be tilted to various angles and locked in adjusted positions by the nut 36.

A pointer 60 is provided to cooperate with indicia on the member 34, as shown, for setting the axis of the tool holder at a predetermined angle.

Spaced guide rods 66 are carried by spaced apart lugs 68 provided on the base 2 and a platform 70 has downwardly depending lugs 72 slidable on the said rods 66.

Transverse rods 74 are carried by lugs 76 on the platform 70 and a motor base 78 has lugs 80 slidable on said rods 74.

A screw member 82 rotatable in an ear 84 of the member 70 threadedly engages a lug 86 on the underside of the motor base 78. The screw 82 may be rotated to bring about transverse back and forth movements of the motor base 78.

A motor 90 is carried by motor base 78 and its shaft 92 carries a grinding wheel 94. A ring member 96 rotatable on a bearing 98 of the motor is clamped in various positions by a screw 100. A rod 102 carried by the ring 96 has a guide 104 fixed thereto.

The ring 96 being rotatable and adapted to be secured in various positions on the bearing 98 locates the guide 104 adjacent the wheel 94 so that a tool may be brought thereagainst for positioning it in a certain way relative to the wheel.

The platform 70 may be moved back and forth in various ways but in the form of the invention shown a lever 106 is pivoted at 108 on the base 2 and has a slot 110 which receives a pin of the platform 70. As the lever swings back and forth the platform 70 is moved thereby back and forth on rods 66.

The motor base being adjustable transversely and longitudinally and the slides on table being adjustable transversely and longitudinally with the head being adjustable angularly a tool may have the portion to be ground positioned by movement of the table as may be desired relative to grinding wheel. By adjusting the slides, platform and motor base relative to the axis of oscillation of the table it is possible to obtain substantially any grinding operation on the tool while the tool guide 104 may be adjusted relative to the wheel for guiding and locating the tool to be ground.

The invention may be embodied in other specific forms without departing from the essential characteristics thereof. Hence, the present embodiments are therefore to be considered in all respects merely as being illustrative and not as being restrictive, the scope of the invention being indicated by the appended claim rather than by the foregoing description, and all modifications and variations as fall within the meaning and purview and range of equivalency of the appended claim are therefore intended to be embraced therein.

What it is desired to claim and secure by Letters Patent of the United States is:

A tool grinding machine comprising in combination, a base, a stud extending vertically upwardly therefrom, a table pivotally supported by said stud for free oscillatable movements back and forth on said stud in horizontal planes at one side of said stud by manual manipulation, said stud being adjustable vertically relative to said base to vary the plane in which said table is swingable, a first slide mounted on said table for movements back and forth in horizontal planes, a second slide mounted on said first-named slide for movements in horizontal planes towards and away from said stud, a head pivotally mounted on said second slide on a horizontal axis for swinging movements in a vertical plane and having a bore the axis of which is directed generally towards said stud, a pair of spaced lower longitudinal rods carried by the base at an opposite side of said stud and disposed on horizontal axes which are directed generally towards said stud, a platform slidable on said lower rods towards and away from said stud, means to move said platform including a lever pivoted on said base connected to said platform, spaced upper rods carried by said platform disposed on horizontal axes and transversely to the lower rods, a motor base slidable on said upper rods, means to move said motor base, a tool carrier rotatably adjustable in said head having a bore for a tool to be ground, and a motor mounted on said motor base having a shaft for an abrasive wheel for acting on the end of a tool in the bore of said tool carrier, all adapted and arranged whereby the carrier and motor shaft may be relatively positioned so that the table may be oscillated to bring an end of a tool in said carrier into contact with a wheel on said motor shaft.

HERBERT F. KILBRIDE.